US010959222B1

(12) United States Patent
Ramachandran et al.

(10) Patent No.: US 10,959,222 B1
(45) Date of Patent: Mar. 23, 2021

(54) ANTENNA ORCHESTRATION AS A SERVICE

(71) Applicant: Amazon Technologies, Inc., Seattle, WA (US)

(72) Inventors: Prabu Ramachandran, Ashburn, VA (US); Nathan Burns, Chesterfield, MO (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/834,882

(22) Filed: Mar. 30, 2020

(51) Int. Cl.
H04N 7/20 (2006.01)
H04W 72/04 (2009.01)
H04W 28/26 (2009.01)
H04W 16/26 (2009.01)

(52) U.S. Cl.
CPC ......... *H04W 72/044* (2013.01); *H04W 16/26* (2013.01); *H04W 28/26* (2013.01); *H04W 72/048* (2013.01)

(58) Field of Classification Search
None
See application file for complete search history.

(56) References Cited

U.S. PATENT DOCUMENTS

2005/0283808 A1\* 12/2005 Quere .................. H01Q 1/247
725/68

\* cited by examiner

*Primary Examiner* — Gary Lafontant
(74) *Attorney, Agent, or Firm* — Klarquist Sparkman, LLP

(57) ABSTRACT

A matchmaking service can match a satellite owner/operator with antennas that are available and capable of servicing a communication request from the satellite owner/operator (e.g., to exchange data with the satellite owner/operator's satellite). The communication request may be received at a ground station service, and information included therein may be compared to capabilities of antennas registered with the ground station service to determine antennas that are compatible with the request. The ground station service may reserve a time slot for a selected compatible antenna to service the request and control the selected compatible antenna (e.g., to track and communicate with the satellite) during the time slot. In some embodiments, the matchmaking of satellite owners/operators to antennas uses models to determine communication parameters for a communication request and to determine capabilities of antennas registered with the ground station.

20 Claims, 7 Drawing Sheets

ANTENNA ORCHESTRATION AS A SERVICE

BACKGROUND

Satellites are increasingly employed by various independently operating entities (e.g., businesses, universities, or governments) for applications such as weather, surface imaging, communications, data transmission, space measurements, geosynchronous positioning, etc. In many examples, the owner or operator of the satellite is primarily concerned with the payload operation (e.g., the function performed by the satellite), which generally requires establishing a communication link between a satellite ground station and the orbiting satellite for transmission of data therebetween.

The owner or operator of a given satellite may exchange data with the satellite via an antenna that is local to the ground station. Servicing communication requests from owners and operators of multiple satellites with a single ground station antenna may quickly fill available communication time, leading to delays in servicing the requests, however, building additional antennas and/or ground stations may be costly and/or resource intensive.

DETAILED DESCRIPTION

Figure 1:
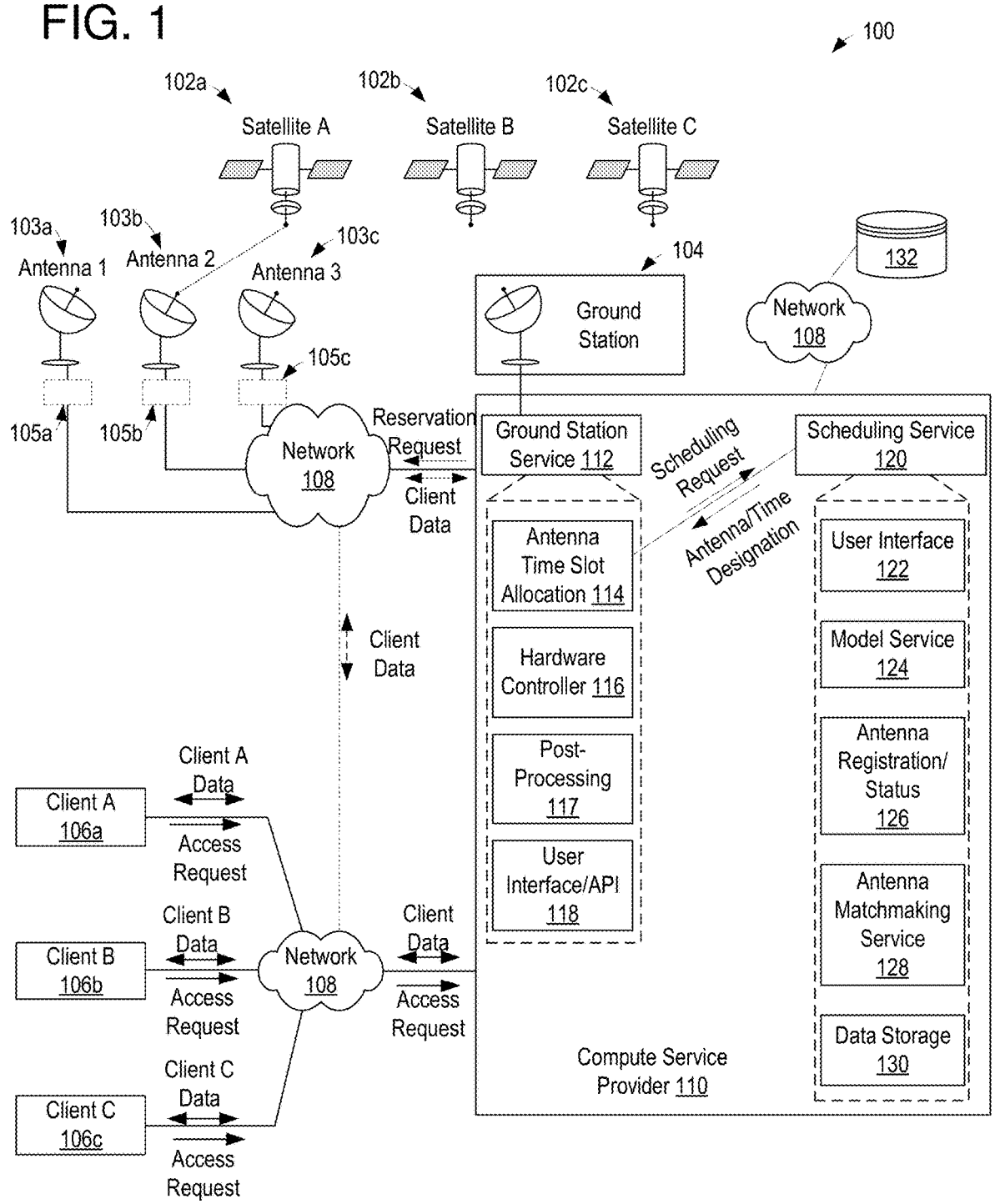
FIG. 1 is a diagram of an example satellite ground station service with a scheduling service to reserve and control communications between clients, antennas, and satellites.

Antennas and/or ground stations for communicating with satellites may constitute a great financial and logistical undertaking for a client. Further, those antenna owners who do construct and maintain antennas for communicating with satellites may find that there is a significant portion of time during the normal operation of the antenna that the antenna is dormant and not used for communicating with a satellite associated with the antenna owner. Instead of clients (e.g., independent owners/operators/users of different satellites) having to build, maintain, and manage an antenna and/or ground station for communicating with each satellite themselves, a scheduling service for a centralized ground station in a compute service provider network may use available time on other antennas (e.g., antennas owned by other entities, which may be generally remote from the ground station) to service communication requests with satellites.

The client may provide information that identifies the satellite of interest, for example, an assigned satellite identifier (e.g., an ID number assigned by a ground station service provider, a tracking or ID number assigned by a governmental agency such as North American Aerospace Defense Command (NORAD) or National Aeronautics and Space Administration (NASA), etc.), point angles (e.g., time and orientation for detection by antenna of a ground station of radio frequency (RF) radiation from the satellite), ranging of the satellite (e.g., Doppler shift of frequency of RF radiation from satellite, 1-way or 2-way radiometric ranging, etc.), global positioning system (GPS) telemetry of a beacon of the satellite, imaging of the satellite (e.g., high-resolution timed exposure of the night sky through which the satellite travels), etc. The client may also provide information that identifies parameters of the communication, such as a type of data being communicated, modulation and/or coding of the data to be used during communication, fault tolerance of the data, etc. Based on registered antenna information (e.g., information provided by the antenna owner and/or sourced from a third party data source indicating antenna characteristics and time windows that the antenna owner has allocated for use by the ground station/other client devices) and real-time antenna status information (e.g., current operating state/health of the antenna, current reservations, etc.), a scheduling service may identify antennas that are able to service the request and identify a next-available time slot among those antennas that are able to service the request. The ground station may then reserve (on behalf of the client device) the identified next-available time slot for the associated antenna that is able to service the request.

Accordingly, during the reserved time slot, control of the associated antenna may be handed over to the ground station (or another ground station in the network) for servicing the request during the time slot, then relinquished back to the antenna owner (or maintained with the ground station if the following time slot is also reserved for servicing a third-party client request, where "third-party" is used in examples herein to indicate a party other than the antenna owner/representative) after the time slot has passed. The antenna owner may be incentivized to offer the use of the antenna in some examples (e.g., the ground station may offer compensation to the antenna owner, such as monetary compensation, ground station/network resource allocation compensation, etc.). In this way, unused operational time of antennas may be leveraged for servicing other clients' satellite communication requests, thereby increasing satellite access availability for members of a compute service provider network without constructing new antennas. In some embodiments, the scheduling service can be integrated with a satellite ground station service, thereby allowing a client of the ground station service to schedule communication between any ground station of the service and the designated satellite using any antenna that is coupled to and/or that is a part of the compute service provider network.

Referring to FIG. 1, a network setup 100 for multiple clients 106a-106c to communicate with multiple respective satellites 102a-102c via one or more satellite ground stations 104 utilizing one or more antennas 103a-103c is shown. Clients 106a-106c can be respective owners of satellites 102a-102c, respective operators of satellites 102a-102c, or any other user of ground station service 112 otherwise authorized to have access to satellites 102a-102c. The owners or operators of the satellites may be different from the owners and/or operators of the antennas 103a-103c.

Although three clients, three satellites, three antennas, and a single ground station (and associated antenna, which may be local to the ground station and remote from the other antennas 103a-103c) are shown in FIG. 1, any number of clients, satellites, antennas, and ground stations is possible, and embodiments are not limited to the illustrated numbers.

Clients 106a-106c can communicate via network 108 with ground station service 112 to schedule communication sessions between satellites 102a-102c and ground station 104 and receive data from scheduled communication sessions. Client devices associated with the clients 106a-106c may be a part of the same compute service provider network as the ground station service 112 in some examples. In other examples, the client devices may be outside of the compute service provider network. Ground station 104 of ground station service 112 can include one or more satellite antennas, software defined radios, and modems to communicate with satellites 102a-102c and/or antennas 103a-103c using radio signals. Based on instructions received from clients 106a-106c at ground station service 112 via a network 108, the ground station 104 can receive, via the ground station's antenna and/or via a designated one of antennas 103a-103c data downlinked from the satellites 102, monitor health and status of satellites 102, and/or provide commands to perform tasks or uplink data to the satellites 102.

Network 108 can include any suitable combination of networking hardware and protocols that establish network-based communications with compute service provider 110. For example, network 108 can comprise the various telecommunications networks and service providers that collectively implement the Internet. Alternatively or additionally, network 108 can include private networks, such as local area networks (LANs) or wide area networks (WANs), and/or public or private wireless networks. For example, a given client 106a and compute service provider 110 may each be respectively provisioned within enterprises having their own internal networks (e.g., which are only connected to the compute service provider 110 and are not connected to other networks). In such an example, network 108 can include hardware and software to establish a networking link between client 106a and the Internet, and between the Internet and compute service provider 110. In some embodiments, clients 106 may communicate with compute service provider 110 using a direct connection rather than network 108. Although multiple elements (e.g., each of clients 106a-106c, antennas 103a-103c, etc.) are shown communicating with compute service provider 110 through the network 108, it is to be understood that the representation of a single network 108 is representative, and some or all of the elements may communicate with the compute service provider through different networks operating according to different protocols, having different hardware, etc.

Ground station service 112 can be part of compute service provider 110, which may provide one or more services (such as various types of cloud-based computing or storage) accessible via network 108 to clients 106a-106c. For example, compute service provider 110 may include numerous data centers hosting various resource pools, such as collections of physical and/or virtualized computer servers, storage devices, networking equipment and the like (e.g., as described below with respect to computing environment 700 in FIG. 7), that implement and distribute the infrastructure and services offered by the compute service provider 110. In some embodiments, compute service provider 110 can provide computing resources, such as a virtual compute service, data storage service (e.g., block-based storage service or various other storage types, such as object/key-value based data stores or various types of database systems), and/or any other type of network-based service. Clients 106a-106c can access the services offered by compute service provider 110 via network 138. Similarly, the network-based services can communicate with and/or make use of each other to provide different services. For example, computing resources offered to clients in units called "instances," such as virtual or physical compute instances or storage instances, may make use of other resources. Further examples of features that may be included in and/or offered by the compute service provider 110 are described in more detail below with respect to FIG. 6.

In some embodiments, the ground station service 112 can coordinate with a scheduling service 120, which can also be a part of compute service provider 110, in order to identify an antenna and associated time slot for use in servicing a communication request from a selected client (e.g., an access request from one of clients 106a-106c) to communicate with a selected satellite (e.g., one of satellites 102a-102c). For example, the ground station service 112 may request that the scheduling service 120 determine and return an antenna designation for a selected antenna that is compatible with and able to service the client's communication request and a time slot during which the selected antenna is available to service the client's communication request.

The dotted line box corresponding to ground station service 112 illustrates a logical view of some of the services and/or modules that may be offered by ground station 112, for example, antenna time slot allocation module 114, ground station hardware controller 116, and user interface 118. In embodiments, the user interface 118 can be a web-based graphical user interface (GUI) or an application programmatic interface (API), for example, when one of the clients 106a-106c programmatically submits the communication request. For example, the API of user interface 118 can function as an endpoint that allows programmatic integration of the ground station service 112 into existing satellite operation systems. Antenna time slot allocation module 114 of the ground station service 112 can convert the antenna and time slot designations returned by the scheduling service 120 into a reservation request for an associated antenna (e.g., one of antennas 103a-103c) for communication with the requested satellite.

Upon successful reservation, and at the scheduled time slot, the hardware control module 116 can then translate the communication request into appropriate motor control signals that move the associated antenna (e.g., adjust directionality of the antenna) to point at the requested satellite for communication therewith. For example, the control signals may optionally be sent to control equipment for the respective antennas (e.g., control equipment 105a for Antenna 1, control equipment 105b for Antenna 2, and/or control equipment 105c for Antenna 3). The control equipment for each antenna may include hardware and/or software modules associated with the respective antenna that are configured to receive the reservation request and/or control instructions from the ground station service 112 and operate the respective antenna according to the reservation request/control instructions (e.g., configuring the antenna for a requested communication with a requested satellite at a requested time slot). In response, as shown, the antenna may communicate requested client data from the satellite to the associated client (e.g., via the compute service provider 110 or optionally directly over the network 108, as shown by the dashed line between the networks used by the antennas and clients, respectively). Although described in consideration of transmitting client data from the satellite to the associated client, it is to be understood that the operations performed herein may similarly facilitate the transmission of command and control signals or other data from the client to the satellite via the selected antenna during the reserved time slot. In some examples, a data plane (e.g., used for communicating client data between a client device and a satellite) may be separate from a control plane (e.g., used for communicating control instructions/data for controlling operation of the antenna).

A post-processing module 117 may be configured to process incoming and/or outgoing client data and/or control data. For example, the post-processing module 117 may be configured to encode/decode, modulate/demodulate, and/or otherwise configure data for communication between the satellite and the client device. The parameters for the post-processing may be based on a client request for communications and/or a configuration of the satellite, antenna, and/or client device used in the associated communication. In some examples, a first portion of the post-processing may be performed at the antenna using one or more antenna components, while a second portion of the post-processing may be performed at the ground station via post-processing module 117. For example, the client data transmitted between the antennas 103 and the compute service provider 110 may include client data that is ready for the client (e.g., demodulated and decoded), client data that has been partially processed for the client (e.g., just demodulated but not decoded), and/or client data that has not been processed for the client (e.g., neither demodulated nor decoded, such as the raw signal output from the satellite).

The dotted line box corresponding to scheduling service 120 illustrates a logical view of services and/or modules that may be offered by scheduling service 120, for example, a user interface 122, a model service 124, an antenna registration/status service 126, an antenna matchmaking service 128, and a data storage service 130. As described above, the scheduling service may be configured to return an antenna and time slot designation for using a selected antenna to communicate with a satellite based on a client request (e.g., from a client, such as one of clients 106a-106c, optionally propagated to the scheduling service 120 via ground station service 112) to user interface 122. For example, the user interface 122 can be a web-based GUI when the client request is directly from one of the clients 106a-106c. Alternatively, the user interface 122 can be an API, for example, when the client request is from the ground station service 112 in response to a request from one of the clients 106a-106c to ground station service 112 for communication with one of the satellites 102a-102c. For example, the API of user interface 122 can function as an endpoint that allows programmatic integration of the scheduling service 120 into existing satellite operation systems.

The data storage service 130 can store therein various data and/or models employed by the scheduling service 120 in determining an antenna and time slot for servicing a communication request. The data storage service 128 can provide any type of data storage, such as, but not limited to, a block-based storage service that provides block-storage resources to compute instances of a compute service, an object-based storage service that stores data objects, a cold storage service that provides a low-cost storage solution for infrequently accessed data objects, or a database. In an exemplary embodiment, the data storage service 128 can be a cloud-based nonSQL database service, such as Amazon Web Services (AWS) DynamoDB.

The antenna registration/status service 126 may be configured to coordinate the storage and maintenance of a repository of information for each antenna. For example, when a representative (e.g., an owner, operator, or other representative entity) of an antenna decides to make the antenna available for use by third-party clients to service communication requests between the clients and one or more satellites, the representative may provide registration information to register the antenna with the ground station service 112 and/or the scheduling service 120. In some examples, the registration information may be provided to the ground station service 112 and/or the scheduling service 120 (e.g., using an associated user interface 118 or 122, respectively) via a network, such as network 108. In other examples, the registration information may be stored in a data source 132 that is accessible by the ground station service 112 and/or scheduling service 120 via network 108. Similar data provisioning may be performed to provide status information for connected antennas (e.g., information regarding an operational state of the antennas, changes in antenna registration information, etc. may be provided by representative communication and/or by accessing a data source, such as data source 132). In some examples, the antenna registration/status service may be called responsive to a request from an antenna representative to register the antenna and/or to update information regarding the antenna. The antenna registration/status service may additionally or alternatively be called responsive to an automated detection (e.g., by the scheduling service 120, the ground station service 112, and/or another connected watchdog service) that an operational status or other information relating to the antenna has changed. The registration and status information and associated service will be described in more detail below with respect to FIG. 2.

The antenna matchmaking service 128 can employ a comparison methodology to identify a compatible antenna for a requested communication with a requested satellite. For example, the antenna matchmaking service may extract communication information from a communication request received from a client (e.g., received via the user interface 122 and/or received via the ground station service 112) and apply the extracted information to a model (e.g., generated and maintained by model service 124, described in more detail below) to determine parameters of the communication request that are to be matched with compatible antennas. The antenna matchmaking service 128 may compare these determined parameters to available antennas (based on the registration and status information generated by the antenna registration/status service 126 and/or stored in the data storage service 130) in order to identify antennas that are compatible with the request (e.g., antennas that are able to service the request and are or will be available to service the request).

The antenna matchmaking service 128 may also evaluate available time slots on the identified compatible antennas in order to determine which antenna is available to service the communication request closest to a current time or closest to a requested time for the communication as designated in the communication request from the client. As used in examples herein, the term "next available time slot" may reference an available time slot for a compatible antenna that is closest to a current time or closest to a requested time (or earliest time if the requested time is a time window) for the communication. As further used herein, the term "available" when describing a time slot may reference a time slot that is not yet reserved (e.g., neither reserved for communications by the representative of the antenna nor reserved for communications by a third-party client, such as clients 106a-106c). The antenna matchmaking service 128 may output (e.g., to the ground station service 112 and/or to another requesting entity) an indication of the next available time slot and a designation of the antenna (or antennas) that are available during the next available time slot and that are compatible with the communication request (e.g., able to service the communication request).

In some examples, the antenna matchmaking service 128 may output the antenna/time designations described above to the data storage service 130 for storage alongside information from the communication request. In this way, historical data of antennas matched with communication requests may be maintained. The historical data may be used in some examples to assist in generating or updating models (e.g., using prior-determined matches to map communication request parameters to compatible antennas/antenna features) and/or to provide a quick match recommendation for a communication request based on prior compatible antenna designations for requests having the same parameters.

For example, if a particular client has been matched with the same antenna to service communication requests (each having at least some of the same parameters) a threshold number of times, the matchmaking service may, upon receipt of a new request from the client having the same parameters as the prior communication requests, automatically identify the same antenna to service the new request and output a designation of the antenna and a next available time slot on the antenna.

In some embodiments, the model service 124 is configured to generate or update models used in deriving client communication parameters from communication request information and used in deriving compatible antenna features for a given set of communication parameters. For example, as described above, the model service 124 can use data from historical antenna/communication request matches to update a model, which updated model can then be globally applied for subsequent antenna/communication request matchmaking processes. The aggregation of data from historical matches across multiple clients and antennas thus allows the scheduling service 120 to achieve a matchmaking accuracy that would otherwise be unattainable by clients 106a-106c determining an antenna match independently. In effect, subsequent requests for matchmaking clients to antennas (e.g., for providing communication between client 106c and satellite 102c) can reap the benefit of improved accuracy by virtue of the model updated based on prior client/antenna matchmaking (e.g., for communicating between client 106a and satellite 102a and/or for communicating between client 106b and satellite 102b). Further features of the model service 124 and the associated models are described in more detail below with respect to FIG. 2.

In some embodiments, scheduling service 120 can instantiate one or more session instances using virtualized compute resources of another service of a compute service provider 110 that includes the ground station service 112. In some embodiments, the session instances may include a model modification instance, for example, to update a global model used in antenna matchmaking. For example, a virtual compute instance can be implemented on one or more resource hosts included in a data center that comprises one or more servers with a specified computational capacity (e.g., indicated by the type and number of central processing units (CPUs), memory size, etc.) and a specified software stack (e.g., a particular version of an operating system, which may run on top of a hypervisor). In different embodiments, various computing devices can be employed alone or in combination to implement the compute instances of virtual compute services (e.g., ground station service 112 and/or scheduling service 120), including special purpose computer servers, storage devices, network devices, etc. In an exemplary embodiment, the scheduling service 120 can provide the user interface 122 as an API using, for example, AWS API Gateway, and can provide model service 124, antenna registration/status service 126, and/or antenna matchmaking service 128 via a serverless computing platform such as AWS Lambda. Alternatively, physical computing resources can be used for session instances of the ground station service 112 and/or scheduling service 120 in place of or in addition to virtual compute resources.

Clients of compute service provider 110 (e.g., clients 106) and/or clients of scheduling service 120 (e.g., ground station service 112) encompass any type of client configurable to submit requests thereto. In some embodiments, clients include satellite owners/operators and/or other clients of a compute service provider 110. For example, a client includes a suitable version of a web browser, a plug-in module or other type of code module configured to execute as an extension to or within an execution environment provided by a web browser, or any other type of web-enabled application.

Alternatively or additionally, a client encompasses an application, such as but not limited to, a database application (or user interface thereof), a media application, an office application, or any other application that employs compute instances of a compute service, or other network-based services in compute service provider 110 to perform various operations. In some embodiments, such an application may include sufficient protocol support (e.g., for Hypertext Transfer Protocol (HTTP)) to generate and process network-based service requests without otherwise requiring full browser support for all types of network-based data. In some embodiments, clients generate network-based service requests to either ground station service 112 or scheduling service 120 according to a Representational State Transfer (REST)-style network-based service architecture, a document- or message-based network-based service architecture, or another suitable network-based service architecture.

The antennas described herein may include single-access antennas (e.g., antennas that are configured to communicate data between a satellite and one client device at a time and/or otherwise communicate with client devices in a time division multiplex configuration). In other examples, the antennas described herein may include multi-access antennas (e.g., antennas that are able to communicate data between one or more satellites and a plurality of client devices simultaneously). For example, the antennas described herein may include phased array antennas that can form multiple beams that can be steered independently to send/receive data to/from multiple clients and/or satellites at the same time. The example processes described herein may be adapted for multi-access antennas by performing operations for multiple client devices and/or satellites. For example, scheduling operations may be performed for identifying time slots that can accommodate multiple communication requests and/or requests for communicating data to/from multiple client devices and/or satellites. As another example, the ground station hardware controller 116 may be configured to send control instructions relating to the formation of multiple beams for steering data to/from multiple client devices and/or satellites. The configuration of an antenna as a single-access or multi-access antenna may be included in the registration data of the antenna and may be an example of a registered capability of the antenna.

Figure 2:
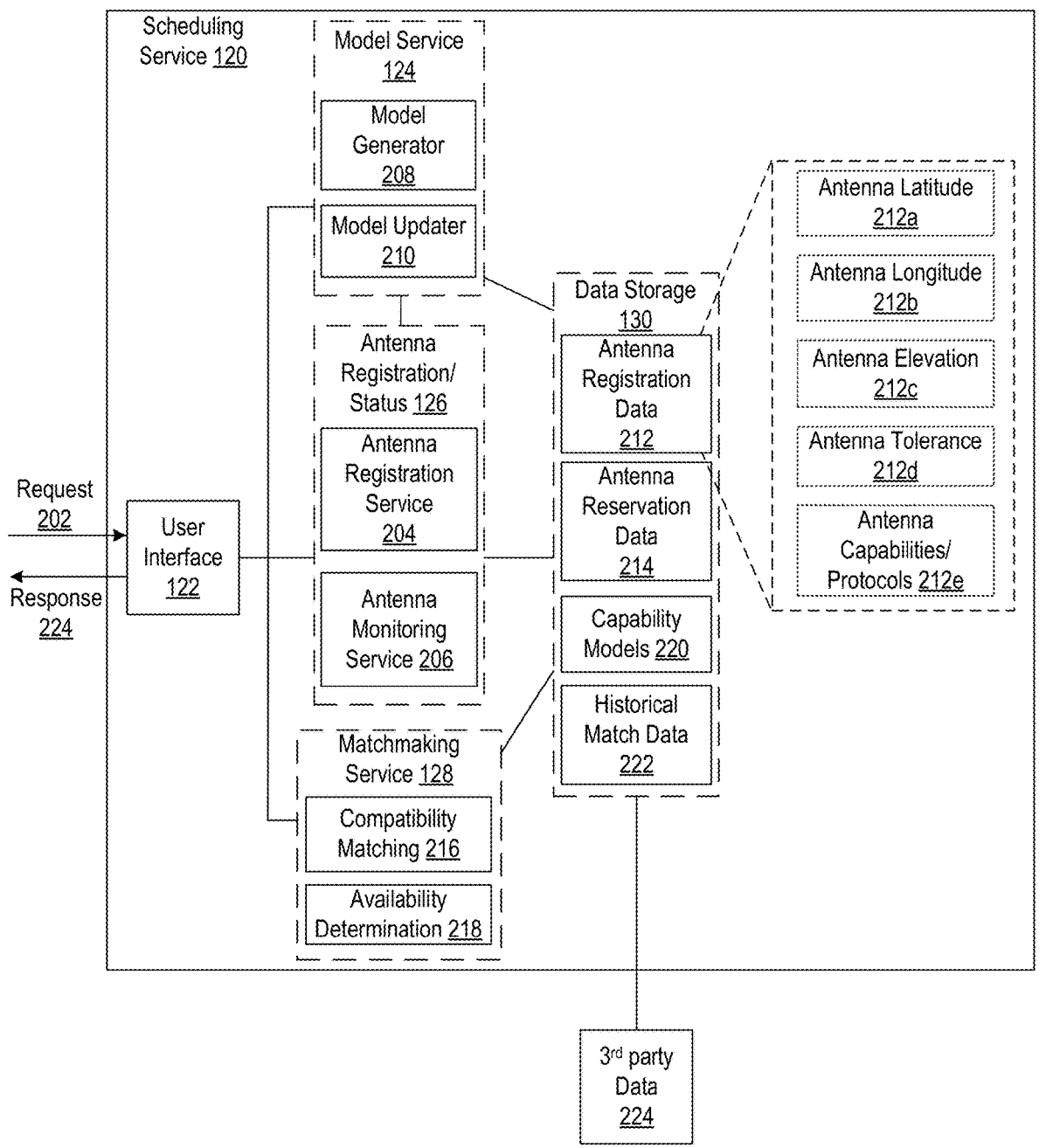
FIG. 2 is a schematic diagram illustrating aspects of an example scheduling service.

FIG. 2 shows additional details of the scheduling service 120, described above with respect to FIG. 1. The scheduling service 120 can receive a request 202 including information usable to facilitate the scheduling of communications between a client and a satellite using available time on one or more remote antennas. The request 202 may be received by the user interface 122 of the scheduling service 120. In some embodiments, initial processing may be performed on the request 202 (e.g., by the user interface 122 and/or by another module) to parse the request and intelligently forward relevant portions of the request to different services, such as the model service 124, the antenna registration/status service 126, and/or the matchmaking service 128. In other embodiments, the request 202 may be passed along to the above services without processing (or with minimal processing, such as to convert the request to a format that is compatible with the associated services).

In some embodiments, the request 202 may be a communication request for exchanging data between a client and a satellite. For example, the request may include any information that sufficiently identifies the satellite with which communication is requested, as described above. The request 202 may be received from a ground station service, such as ground station service 112 of FIG. 1, and/or from the client requesting the satellite communication. In some embodiments, the request may further include parameters for a requested communication session between the client and the satellite (e.g., protocols to be used during communication, data rate, signal modulation, and delay requests/thresholds, amount/type of data to be communicated, which may include expected uplink and downlink data amounts/timing/etc., requested length/timing of communication with the satellite, and/or other parameters). In additional or alternative embodiments, one or more parameters of the requested communication may be derivable from other information in the request 202.

In other embodiments, the request 202 may include a request to register or update antenna information. For example, the request 202 may include identification information for the antenna, location/telemetry information for the antenna, operating status information for the antenna, configuration/capabilities information for the antenna, etc.

In examples where the request 202 includes a request to register or update antenna information, the request and/or information derived therefrom may be provided to the antenna registration/status service 126. The antenna registration/status service 126 may include an antenna registration service 204 and an antenna monitoring service 206. The antenna registration service 204 may be called to parse antenna information for an identified antenna as received in a registration request and generate or update a record associated with the identified antenna. For example, the antenna registration service 204 may update antenna registration data 212 in the data store 130 to include and/or update information relating to the identified antenna. As shown in FIG. 2, the registration data may include antenna location data (e.g., antenna latitude 212a, antenna longitude 212b, and antenna elevation 212c), antenna tolerance 212d, antenna capabilities/protocols 212e, and/or other antenna information (e.g., antenna operating status information, etc.). The registration data for each registered antenna may be stored in association with an identifier for the respective antenna. In some examples, antenna capabilities that are registered may be classified as having an associated type, which is used for matching the capabilities to communication parameters relating to client requests for communication. The capability type may be provided by the antenna representative as part of the registration or determined/assigned by the antenna registration service 204. For example, capability models 220 may include one or more models configured to model capabilities of the antenna based on the received registration information for the antenna.

The antenna registration service 204 may also be configured to perform a control qualification process based on credentials for controlling the antenna and/or configuration information for the antenna received in an antenna registration request. The control qualification process may include verifying whether the antenna has provided sufficient information to allow the ground station to control the antenna according to a reservation and/or whether the antenna is configured in a manner that is able to be controlled by the ground station according to a reservation. If the verification is successful, a flag indicating that the antenna is able to be controlled by the ground station may be stored in association with an identifier of the antenna in the antenna registration data 212. If the verification is not successful (e.g., the ground station determines that the available configuration information for the antenna is incomplete or incompatible with the ground station such that the ground station is not able to control the antenna), the ground station may request additional information and/or request that the antenna employs a supported control scheme that is compatible with the ground station.

If the information in the request 202 pertains to an antenna that is already registered, the antenna monitoring service 206 may be called to handle the updating of existing information for a selected antenna in the data storage 130 based on the information in the request. In some examples, the antenna monitoring service 206 may also generate requests for status update information, which are sent (e.g., via user interface 122) outward to a ground station or other connected element that is in communication with an antenna of interest. The antenna monitoring service 206 may be configured to generate such update requests responsive to detecting an event (e.g., an event that may affect an associated antenna, such as a weather event) and/or responsive to a time threshold being met (e.g., where the time threshold corresponds to an amount of time that has passed since a last update of information on the antenna). The antenna monitoring service 206 may additionally or alternatively request updated status information responsive to an identification of a satellite as a candidate for servicing a communication request.

An antenna registration or update request may additionally or alternatively include antenna reservation information, such as a time window for which communications between clients and satellites are allowed (e.g., time windows when the antenna owner will allow a ground station to take over control of the antenna to service communication requests from third party clients, such as clients 106a-106c of FIG. 1). Antenna reservation information may also include current/upcoming reservations that have already been made to reserve use of the antenna, or other indications of time during which a reservation for servicing a client communication request cannot be made and/or during which the antenna owner does not allow the antenna to be controlled to service communication requests from the third-party clients. The antenna reservation information may be stored in antenna reservation data 214 of data storage service 130 to update information for an existing antenna or to create a new entry for a newly-registered antenna.

In examples where the request 202 includes a communication request for exchanging data between a client and a satellite, the request may be provided to and/or used to call the matchmaking service 128. The matchmaking service 128 may include a compatibility matching module 216, configured to match the request to one or more antennas that are able to service the request, and an availability determination module 218, configured to determine available time slots for the compatible antennas identified by the compatibility matching module 216 and to identify one of the available time slots as a next available time slot for the communication request.

The compatibility matching module 216 may apply information from the communication request (or information derived from the request 202) to one or more capability models 220, stored in data storage 130 based on operations of the model service 124. For example, the one or more capability models 220 may include one or more communication models that are configured to model parameters of the communication request and determine capabilities of antennas that are compatible with (e.g., able to service/meet the parameters of) the communication request. The compatibility matching module 216 may further compare the modeled parameters to capabilities and features of the antennas, as identified in the antenna registration data 212, to determine a subset of the registered antennas, where the antennas in the subset are compatible with the communication request and the antennas outside of the subset are not compatible with the communication request and/or do not have available time slots for the communication request. In some examples, one or more of the antennas included in the subset may be determined based on an evaluation of historical match data 222 stored in data storage 130 pertaining to the client that issued the communication request and/or other parameters of the communication request.

The availability determination module 218 may query the antenna reservation data 214 in order to determine available time slots for each antenna in the subset identified by the compatibility matching module 216. In some examples, the availability determination module 218 may be configured to continuously update the antenna reservation data 214 to maintain a schedule of time slots for at least a portion of the registered antennas. In such examples, the availability determination module 218 may be called to access the schedule and identify available time slots for selected antennas (e.g., the antennas identified in the subset by the compatibility matching module 216 as described above). In some examples, the availability determination module 218 may be called during the processing performed by the compatibility matching module 216 to eliminate from consideration antennas that are registered but have no availability to handle communications between client devices and satellites.

In some examples, the model service 124 can include a model generation service (model generator) 208, which may be configured to generate one or more models for use by the matchmaking service 128 (e.g., the compatibility matching module 216). For example, the model generation service 208 may receive or retrieve (e.g., from data storage 130) specific data indicative of client-related parameters and antenna parameters to generate models of clients' instances to which data is to be delivered, as well as antenna systems used to deliver data to/from a satellite per a client request. In some embodiments, the data is provided as part of an initial request 202 and forwarded by user interface 122 for use by the model generation service 208. Alternatively or additionally, the data is provided to the scheduling service 120 as part of an initial setup or intake by the client. In some examples, the model generation service 208 uses the specific data from a communication request and/or other data indicating a processing chain to be completed for a given communication request to determine one or more models unique to the client request and to store the models in data store 128. In other examples, the models may be pre-defined and/or otherwise based on earlier-received data from the client devices and/or other sources.

For example, as described above, antenna representatives may register antenna capabilities that are classified according to associated types, while client communication requests may have configurations that are mappable to the types of capabilities of the antennas (e.g., indicating how a given type of capability may be configured for communicating with a satellite associated with the communication request). The client communication request may include or be used to derive a mission profile, where configurations are defined for the communication (e.g., receiving radiofrequency [RF] signals, demodulating the RF signals, decoding the demodulated RF signals, delivering data to an instance running on a client device associated with the client, etc.). For example, the mission profile may stitch together configurations in a directed acyclic graph or other ordering or sorting construct. The model generation service 208 may use this information to model a client's communication parameters. The model generation service 208 may further model what each registered antenna is capable of servicing using the antenna registration data. In this way, the output of the models for the client communication parameters and the antenna capabilities may be used to match client communication requests with compatible antennas (e.g., the compatibility matching module 216 may utilize the models to determine antennas that can service a particular configuration of a communication request).

Each capability of an antenna has an amount of time it takes to configure the capability, prior to start of contact, as well as an amount of time it takes to clean the configuration up and reset the capability to some base value after the contact is over. The model generation service 208 may also generate models defining these set up and tear down times. During matchmaking for a given communication request, the maximum set up and tear down time from the capabilities that are used for a given communication request are added to a time length of the requested communication to determine a time length of a time slot to be reserved (e.g., used by the availability determination module 218 to determine if a compatible antenna has at least one time slot available that is long enough to service the request, including the maximum set up and tear down times). For multi-access antennas, n set up and tear down times may be determined, where n is the number of client devices requesting to communicate during a time slot, and the total time it takes to set up and tear down communications for the n client devices is included in the calculation of the time length of the time slot. In this way, the system may ensure that resources of the antenna are not used by multiple clients at the same time (for single-access antennas) or otherwise by more clients than are able to be serviced simultaneously (for multi-access antennas).

Alternatively or additionally, model service 124 can include a model update service 210, which can be configured to update one or more models for use by the matchmaking service 128. In some embodiments, the model update service 210 can update a global model after each determination (by matchmaking service 128) of an antenna and/or time slot to service a client request, for example, to optimize the global model. In some embodiments, the model update service 210 can periodically update the global model based on multiple prior determinations of antenna and/or time slot matches for client requests, for example, to optimize the global model. Other optimization techniques are also possible according to one or more contemplated embodiments.

Figure 3:
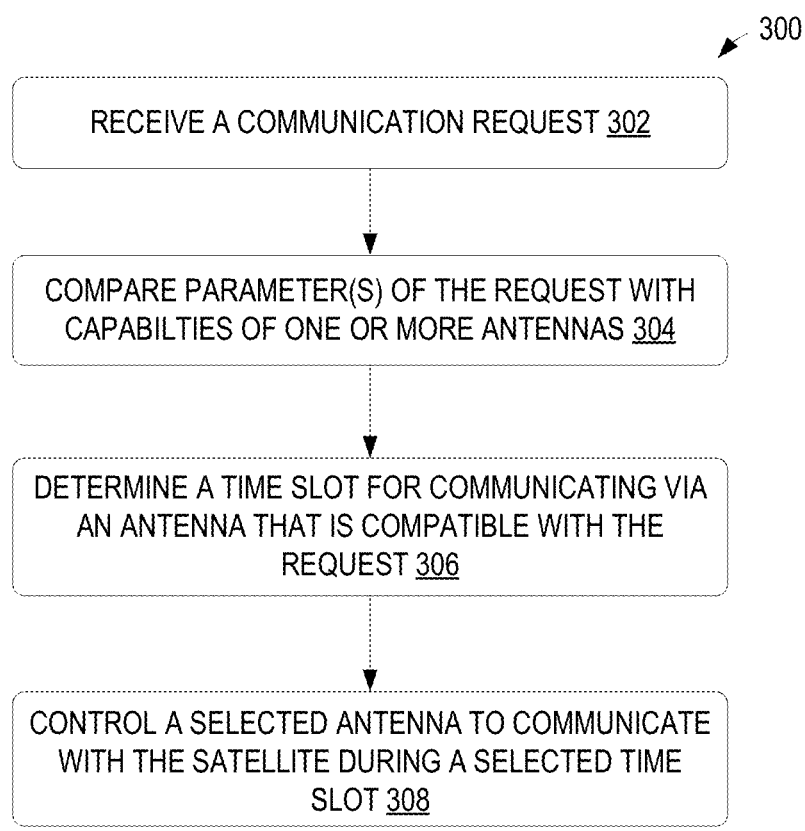
FIG. 3 is a flow chart of an example method of controlling an antenna to communicate with a satellite in order to service a client communication request according to a matchmaking result.

FIG. 3 shows an example method 300 for servicing communication requests. For example, the method 300 may be performed by one or more devices in a compute service provider network, such as a device(s) executing a ground station service (an example of which includes ground station service 112 of FIG. 1) and/or a scheduling service (an example of which includes scheduling service 120 of FIGS. 1 and 2). At 302, the method includes receiving a communication request. For example, the communication request may be received by a client device of a client (e.g., one of clients 106a-106c of FIG. 1). The communication request may include communication parameters and/or information usable to derive communication parameters relating to a request to exchange data with a satellite. For example, the communication request may include an identifier of the satellite with which communication is requested. The communication request may also include an indication of a preferred or requested time slot for performing the communication. Other example features of the communication request include one or more of those features described above with respect to request 202 of FIG. 2.

At 304, the method includes comparing parameters of the communication request with capabilities of one or more antennas. For example, a matchmaking service, such as matchmaking service 128 of FIGS. 1 and 2 may model parameters of the communication request in order to determine antenna capabilities that are usable to service the request. The determined antenna capabilities may be used to identify antennas (having the determined capabilities) that are able to service the request (e.g., antennas that are compatible with the request).

At 306, the method includes determining a time slot for communicating via an antenna that is compatible with the request. For example, an availability determination module, such as the availability determination module 218 of FIG. 2, may analyze time slots for antennas in the network and/or for antennas determined to have compatible capabilities to service the communication request (e.g., determined at 304) to determine which compatible antennas have available time slots (e.g., of a sufficient length to service the request). The service may further determine which of the available time slots on the compatible antennas is a targeted time slot, such as a next-available time slot or a time slot that otherwise meets the parameters of a requested time for performing the communication. For example, if the communication request includes a particular time slot of interest, the targeted time slot may be that time slot of interest, whereas if the communication request includes a range of acceptable time slots, the targeted time slot may be any time slot within that range. In some examples, the determination of a time slot for communicating with the compatible antenna may include generating a list of available time slots on each compatible antenna, providing the list to the client device that issued the communication request, and receiving a selection from the client device indicating a targeted time slot from the list.

At 308, the method includes controlling a selected antenna to communicate with the satellite during a selected time slot. The selected time slot may be defined as the targeted time slot determined at 306 and the selected antenna may be defined as the antenna that is compatible with the request and that is available for communicating during the selected time slot. Controlling the selected antenna may include issuing control instructions to the selected antenna to cause the selected antenna to track the satellite identified in the communication request (during the selected time slot) and communicate data between the satellite and the client device that issued the communication request received at 302. For example, the selected antenna may be controlled via a hardware controller, such as hardware controller 116 of FIG. 1.

Figure 4:
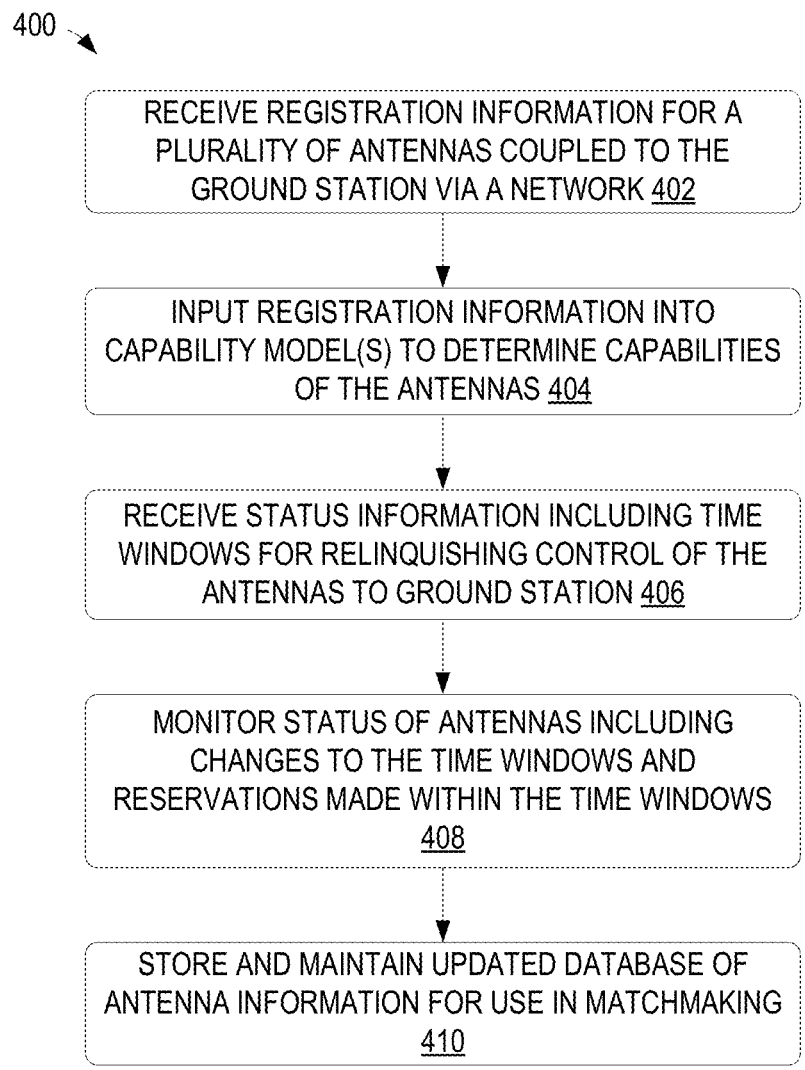
FIG. 4 is a flow chart of an example method of building and maintaining a database of antenna information for use in matchmaking.

FIG. 4 shows an example method 400 for building and maintaining antenna status information for use in matchmaking (e.g., to match an antenna to a client device to service a communication request from the client device). For example, the method 400 may be performed by one or more devices in a compute service provider network, such as a device(s) executing a ground station service (an example of which includes ground station service 112 of FIG. 1) and/or a scheduling service (an example of which includes scheduling service 120 of FIGS. 1 and 2). At 402, the method includes receiving registration information for a plurality of antennas coupled to the ground station via a network. Examples of registration information that may be received are described above with respect to request 202 of FIG. 2 (e.g., for the examples in which the request includes a request to register or update antenna information).

At 404, the method includes inputting at least a portion of the registration information into one or more capability models to determine capabilities of the antennas. For example, the received registration information may be processed by an antenna registration service, such as antenna registration service 204 of FIG. 2, and stored in a data storage module, such as data storage 130 of FIGS. 1 and 2 (e.g., in antenna registration data 212 of FIG. 2). The received information may further be input into one or more capability models, such as capability models 220 of FIG. 2, which may model capabilities of the antenna based on the received information. The model(s) may output indications of the antenna capabilities, which may further be stored in association with an antenna identifier for the associated antenna (e.g., as antenna capabilities/protocols data 212e of antenna registration date 212 in FIG. 2).

As a more detailed example, an antenna may send, as registration data, a set of capabilities or information usable to derive the set of capabilities, each of which has an associated type that is mappable to configurations of a client request. For example, capabilities for the antenna may include an antenna downlink capability, which includes information about the antenna's capabilities that are mappable to frequency, bandwidth, polarization, and/or other parameters of a client request. The different types of capabilities may have different matching logic to match to client request information (described in more detail below with respect to FIG. 5).

At 406, the method includes receiving status information including time windows for relinquishing control of the antennas to the ground station. The time windows may indicate operational time of one or more antennas that the respective owner(s) or other representative(s) of the antenna(s) is making available to service third-party client requests for communicating with satellites. For example, an antenna registration/status service, such as antenna registration/status service 126 of FIGS. 1 and 2, may receive the status information in order to process the information for storage as antenna reservation data (e.g., antenna reservation data 214 of FIG. 2). In this way, the received information may be later accessed to determine available time slots for servicing an incoming client communication request using one or more of the registered antennas.

At 408, the method includes monitoring the status of the antennas including changes to the time windows and reservations made within the time windows. The status of the antennas may also include changes to the antennas that may affect the operation of the antennas and thus the compatibility of the antennas to a given communication request. For example, changes to the status of the antennas may also include changes to communication protocols used by the antennas, observed communication data for the antennas (e.g., indicators of potential degradation of the antennas), changes in positioning/aiming of the antennas, etc.

In some embodiments, an antenna monitoring service, such as antenna monitoring service 206 of FIG. 2, may request and/or receive periodic updates of the status of one or more registered antennas. The status updates may originate from respective owners or other representatives of the registered antennas and/or responsive to events, such as the reservation of antenna resources via a ground station service, such as ground station service 112 of FIG. 1.

At 410, the method includes storing and maintaining an updated database of antenna information for use in matchmaking. For example, antenna registration and reservation data may be stored in a data storage device, such as data storage 130 of FIGS. 1 and 2, in order to provide a repository of antenna information retrievable by other modules and/or services of a scheduling service, such as scheduling service 120 of FIGS. 1 and 2. The stored data may provide and/or include a fast, read-only (from the perspective of a requesting service/device—some services, such as the antenna registration/status service, may have write access) cache of the state of registered antennas to allow for quick identification of a next-available (or other targeted) time slot for one or more selected antennas.

Figure 5:
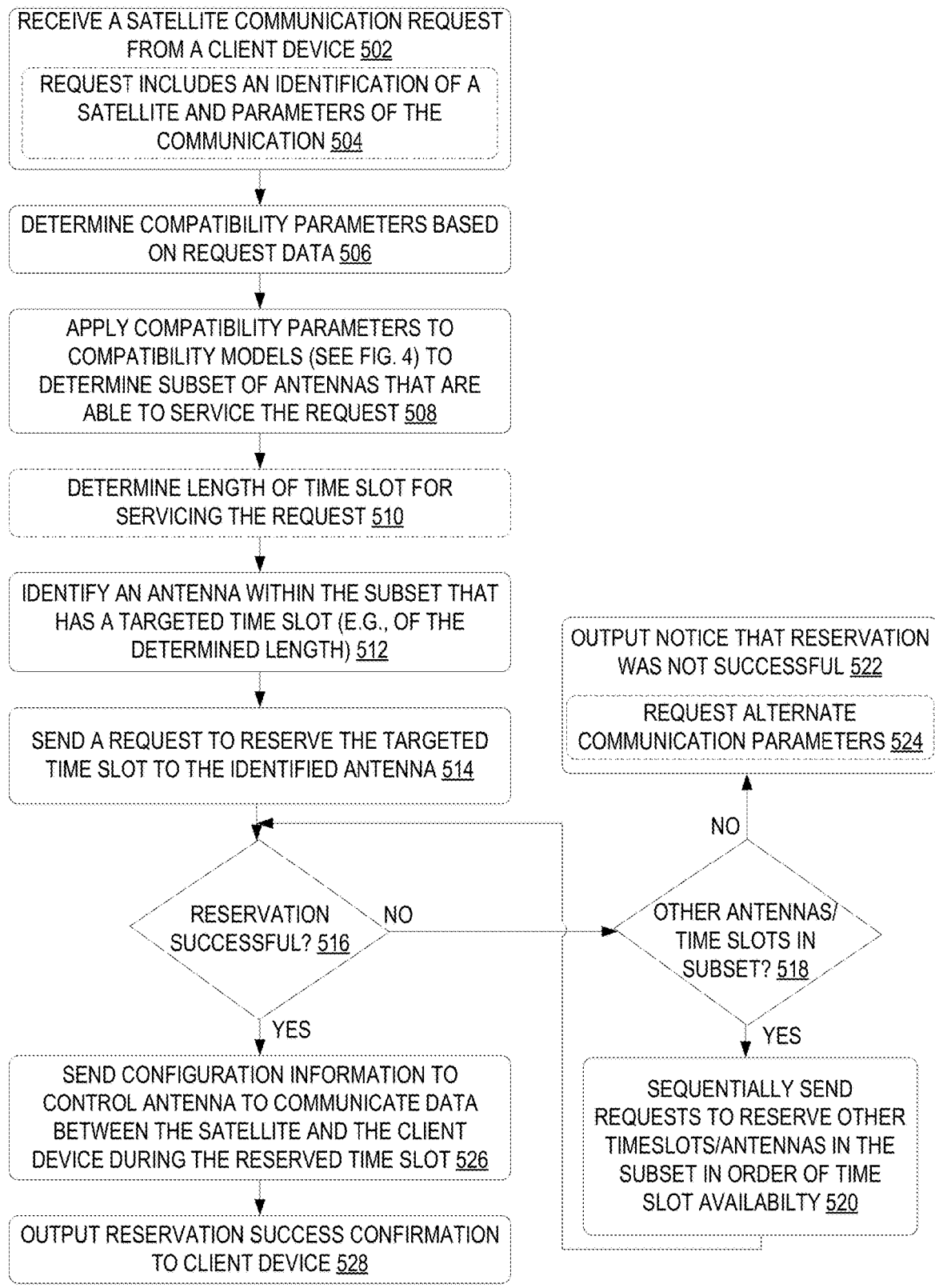
FIG. 5 is a flow chart of an example method of servicing a client communication request by determining and reserving a time slot for communicating with a satellite via an antenna determined to be compatible with the communication request.

FIG. 5 shows an example method 500 for servicing client requests to communicate with a satellite using a networked antenna. For example, the method 500 may be performed by one or more devices in a compute service provider network, such as a device(s) executing a ground station service (an example of which includes ground station service 112 of FIG. 1) and/or a scheduling service (an example of which includes scheduling service 120 of FIGS. 1 and 2). At 502, the method includes receiving a satellite communication request from a client device. As indicated at 504, the request may include an identification of a satellite (with which the client device is requesting to communicate) and parameters of the communication. Other example features of the communication request include one or more of those features described above with respect to the request 202 of FIG. 2 and/or the request received at 302 of FIG. 3.

At 506, the method includes determining compatibility parameters based on the request data. For example, a matchmaking service, such as matchmaking service 128 of FIGS. 1 and 2 (including a compatibility matching module, such as compatibility matching module 216 of FIG. 2) may extract and/or derive capability parameters for the request based on the request data (e.g., using one or more capability models, such as capability models 220 of FIG. 2 in some embodiments).

The capability parameters may identify antenna capabilities that are useable to service the request. Accordingly, at 508, the method includes applying the compatibility parameters to one or more compatibility models (e.g., described in more detail above with respect to FIGS. 2 and 4) to determine a subset of antennas that are able to service the request.

For example, the parameters of the communication request received at 502 may include a mission profile, which includes references to configurations and/or pointers to models that each have matching logic for match the communication parameters to capabilities of antennas. As described above, each antenna capability and each configuration has an associated type, and particular data within a given type of capability/configuration is used to match antennas capabilities with client communication requests. For example, the mission profile included in the communication request may include pointers to multiple sets of configurations that define a graph (e.g., a stored model), and compatible antennas may include antennas having capabilities that fit into the graph.

Example antenna capabilities are described above with respect to FIG. 4. For example, the mission profile may include parameters for how to unwrap the various layers of a signal from a targeted satellite in order to get to the client data. An outermost layer may include a radiofrequency (e.g., what frequency the antenna will need to use to communicate with the targeted satellite), a next layer may include parameters for demodulating the signal from the satellite (and/or modulating client data, such as encoded client data, that is to be sent to the signal), and a next layer may include parameters for decoding the demodulated signal from the satellite (and/or encoding client data that is to be sent to the signal).

At 510, the method optionally includes determining a length of time slot for servicing the request. For example, the length of the time slot may include set up and tear down times for resources and/or capabilities that are to be used by the antennas to service the request, in addition to a length of time for the communication as requested. The length of time for the communication may be identified in the request received at 502, based on a time that the requested satellite is estimated to be in range of a compatible antenna, and/or based on a default or predetermined communication length (e.g., defined by the antenna owner/representative, client issuing the request, ground station service, etc.).

At 512, the method includes identifying an antenna within the subset determined at 508 that has a targeted time slot (e.g., having the determined length as identified at 510). For example, available time slots for each of the antennas in the subset may be determined based on an examination of antenna reservation data (e.g., antenna reservation data 214 of FIG. 2) by an availability determination module (e.g., availability determination module 218 of FIG. 2) to identify all available time slots for antennas that are able to service the request. The available time slots may be compared with one another to determine a targeted time slot, such as a next-available time slot (e.g., a time slot that is closest to a current time, closest to a requested communication time, etc.).

At 514, the method includes sending a request to reserve the targeted time slot to the identified antenna. As shown in FIG. 1, the reservation request may be transmitted to an antenna via a ground station, such as ground station 112. Accordingly, a scheduling service may output to the ground station an identification of the antenna determined to have the targeted time slot, an identification of the time slot, and/or other information from the communication request (e.g., an identification of a satellite with which communication is requested, an identification of capabilities to be used by the antenna to service the request, etc.). Some or all of the above information may be included in the reservation request in order to attempt to reserve antenna resources for servicing the communication request.

At 516, the method includes determining if the reservation is successful (e.g., determining if the antenna accepted the reservation request). If the reservation is not successful (e.g., the antenna rejects the reservation request, "NO" at 516), the method includes determining whether there are any other antennas in the subset and/or available time slots for the previously identified antenna of the subset, as indicated at 518. If there are other available antennas and/or time slots (e.g., the antenna accepts the reservation request, "YES" at 518), the method includes, as indicated at 520, sequentially sending requests to reserve other time slots for the identified antenna and/or time slots on other antennas in the subset in order of time slot availability (e.g., starting with a subsequently next-available or next-closest to a targeted time slot identified in the communication request). The method then returns to 516 to check if the new reservation(s) are successful until a successful reservation is made or until a reservation request is made to all antennas/time slots that meet the criteria of the communication request.

Returning to the query at 518, if there are no other available antennas and/or time slots (e.g., "NO" at 518), the method includes outputting a notice that the reservation was not successful, as indicated at 522. The notice may include details regarding the failure, such as indications of the number and/or identity of antennas/time slots that for which reservations were requested unsuccessfully, indications of any information regarding why the reservations were unsuccessful, etc. In some examples, the ground station may optionally request alternate communication parameters, as indicated at 524, in an attempt to identify another antenna/time slot that could potentially service the communication request from the client device.

Similarly, other optional attempts may be made to service the communication request. For example, an alternate time slot for an antenna that is partially compatible with the request may be suggested and a confirmation regarding whether to attempt to reserve the alternate time slot may be sent to the client device. Another example includes contacting an owner of one or more of the antennas for which a reservation was unsuccessful to troubleshoot the reservation issue.

Returning to 516, if a reservation attempt is successful (e.g., "YES" at 516), the method includes sending configuration information for the communication request to control the selected antenna (for which the reservation was successful) to communicate data between the satellite and the client device during the reserved time slot, as indicated at 526. In some examples, additional information and/or control signals may be transmitted from the ground station to the antenna at a time corresponding to the reserved time slot (e.g., just before, during, and/or after the time slot) to control the antenna to track the satellite with which communication is requested and to control the antenna to propagate data between the requesting client/client device and the satellite. In order to ensure security of the communications, information such as encryption details for the communication may not be provided to the antenna, so that the antenna and/or entities connected to the antenna are not able to interpret the data being communicated during the reserved time slot. At 528, the method includes outputting a reservation success confirmation to the client device.

Figure 6:
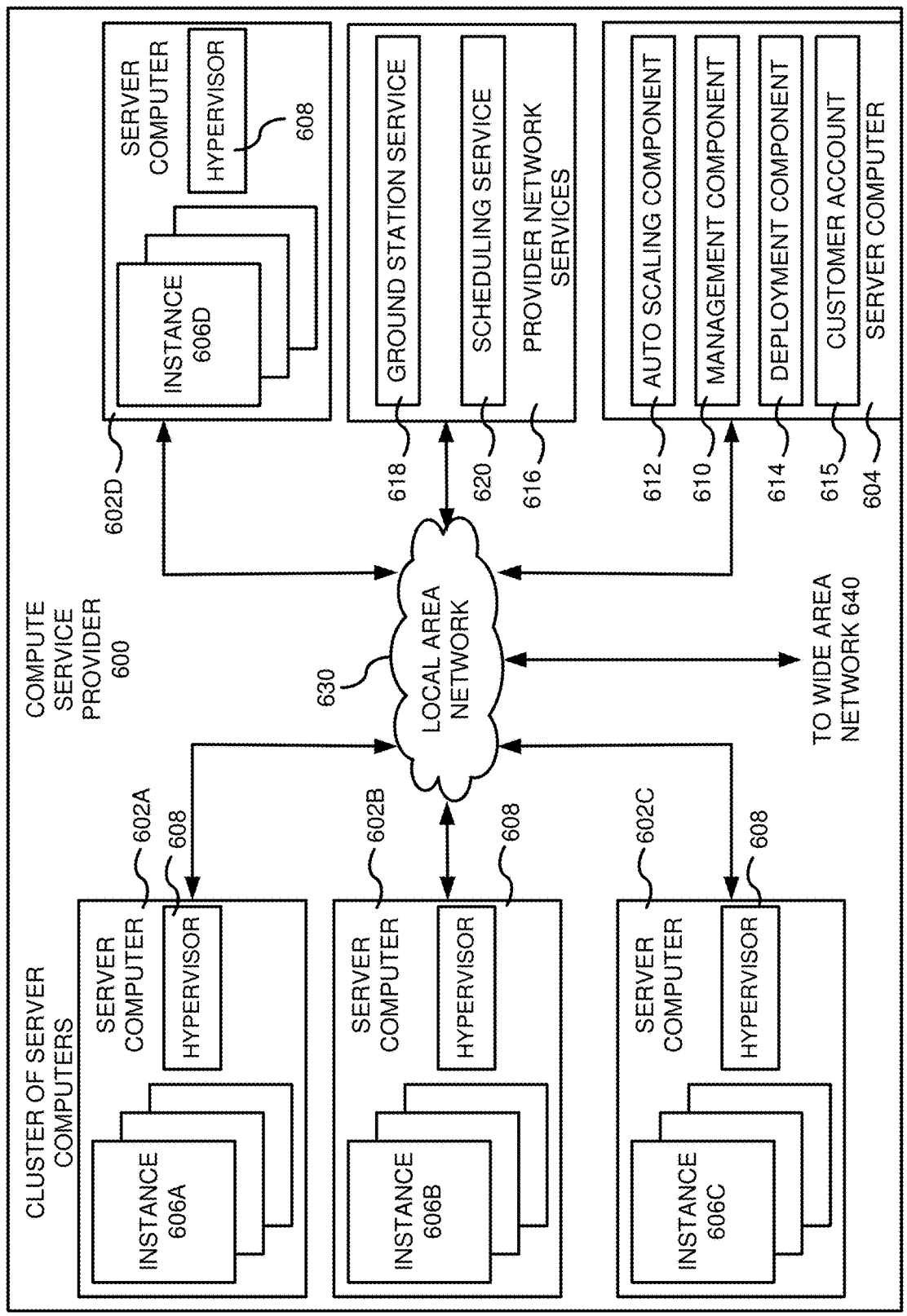
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of clients operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A client can access the management component 610 to configure various aspects of the operation of the instances 606 purchased by the client. For example, the client can purchase, rent or lease instances and make changes to the configuration of the instances. The client can also specify settings regarding how the purchased instances are to be scaled in response to demand. The management component can further include a policy document to implement client policies. An auto scaling component 612 can scale the instances 606 based upon rules defined by the client. In one embodiment, the auto scaling component 612 allows a client to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist clients in the deployment of new instances 606 of computing resources. The deployment component can have access to account information associated with the instances, such as who is the owner of the account, credit card information, country of the owner, etc. The deployment component 614 can receive a configuration from a client that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the client-provided configuration and cache logic to configure, prime, and launch new instances 606. The configuration, cache logic, and other information may be specified by a client using the management component 610 or by providing this information directly to the deployment component 614. The instance manager can be considered part of the deployment component.

Client account information 615 can include any desired information associated with a client of the multi-tenant environment. For example, the client account information can include a unique identifier for a client, a client address, billing information, licensing information, customization parameters for launching instances, scheduling information, auto-scaling parameters, previous IP addresses used to access the account, etc.

Examples of provider network services 616 that may be offered by the compute service provider 600 include a ground station service 618 and a scheduling service 620. For example, the ground station service 618 may be implemented by a ground station, such as ground station 104 of FIG. 1 (e.g., to perform operations as described with respect to ground station service 112 of FIG. 1). The scheduling service 620 may be implemented by the ground station and/or another device of the compute service provider network to which the ground station belongs (e.g., to perform operations as described with respect to scheduling service 120 of FIGS. 1 and 2). In this way, the provider network services 616 may provide antenna orchestration services, as described herein, to allow one or more client devices to communicate with a satellite using a third-party antenna, where such communications may be at least partially coordinated and controlled by the compute service provider 600.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
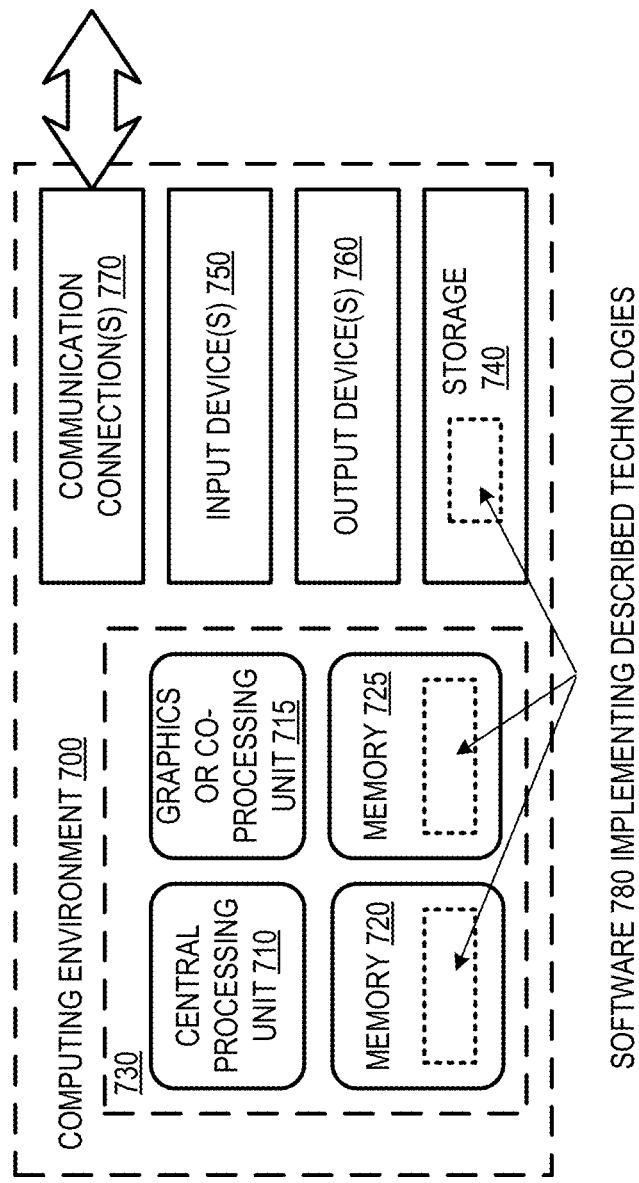
FIG. 7 depicts a generalized example of a suitable computing environment in which the described innovations may be implemented.

FIG. 7 depicts a generalized example of a suitable computing environment 700 in which the described innovations may be implemented. For example, the computing environment 700 may be an example of a computing environment in which ground station service 112 of FIG. 1, the scheduling service 120 of FIGS. 1 and 2, and/or other services, modules, and/or devices described herein are implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer-implemented method of selecting an antenna for communication with a satellite, the method comprising:
   receiving, at a ground station service, registration data to register remote antennas with the ground station service;
   applying the registration data to an antenna model to determine capabilities of each of the remote antennas;
   receiving, at the ground station service, a communication request, the communication request including an identification of the satellite and additional communication information;
   applying the additional communication information and the identification of the satellite to a communication model to determine communication parameters of the communication request;
   comparing the communication parameters of the communication request with the determined capabilities of the remote antennas to determine a subset of the remote antennas, each remote antenna in the subset being capable to service the communication request;
   determining available time slots for communicating via each remote antenna of the subset and selecting a targeted time slot from among the available time slots;
   identifying a selected remote antenna of the subset that is available to communicate during the selected time slot; and
   sending control instructions to the selected remote antenna to control the selected remote antenna to communicate with the satellite during the selected time slot.

2. The computer-implemented method of claim 1, further comprising sending a reservation request to the selected remote antenna, wherein the control instructions are sent to the selected remote antenna responsive to the selected antenna accepting the reservation, and wherein control instructions are sent to a different remote antenna from the subset responsive to the selected remote antenna rejecting the reservation.

3. The computer-implemented method of claim 1, wherein the control instructions include instructions to control the selected remote antenna to adjust directionality parameters to track a location of the satellite during the selected time slot.

4. The computer-implemented method of claim 1, wherein the selected time slot includes time for communicating data between a client device and the satellite, time to set up the selected remote antenna for communicating with the satellite, and time to reset the antenna after communicating with the satellite.

5. A system comprising:
   a communication interface communicatively coupled to a plurality of antennas;
   one or more processors; and
   a storage device storing instructions executable by the one or more processors to:

receive a request from the client device to communicate with a satellite;

compare parameters of the request with capabilities of the one or more antennas to determine a targeted time slot for a selected antenna that is compatible with the request; and control the selected antenna to communicate with the satellite during the determined targeted time slot.

6. The system of claim 5, wherein the instructions are further executable to apply data from the request to one or more models to model the parameters of the request.

7. The system of claim 5, wherein the instructions are further executable to apply registration data for the antennas to a model to determine the capabilities of the antennas.

8. The system of claim 7, wherein the registration data includes one or more of antenna location data, antenna tolerance data, antenna protocols, or capability data for each of the one or more antennas.

9. The system of claim 7, wherein the instructions are further executable to store match data corresponding to a matching of the selected antenna to the request.

10. The system of claim 9, wherein the model is updated based on the stored match data.

11. The system of claim 5, wherein the instructions are further executable to determine available time slots for communicating via each antenna of the plurality of antennas that is compatible with the request and to select the targeted time slot from the determined available time slots.

12. The system of claim 5, wherein controlling the selected antenna to communicate with the satellite comprises sending control instructions to the selected antenna, the control instructions including instructions to adjust a parameter of antenna system components of the antenna during the determined targeted time slot to track a location of the satellite during the determined targeted time slot.

13. The system of claim 5, wherein the system is included in a provider network for cloud-computing services.

14. The system of claim 13, wherein the plurality of antennas includes an antenna that is outside of the provider network.

15. The system of claim 5, wherein the system is included in a ground station that controls a local ground station antenna, the plurality of antennas being remote from the ground station antenna and accessible by the ground station via a network.

16. A satellite service comprising:

a satellite ground station communicatively coupled to a plurality of antennas for communicating with a satellite, the antennas being remote from the satellite ground station and coupled to the satellite ground station over a network;

one or more computing devices for receiving a request from a client device for controlling a selected antenna of the plurality of antennas to communicate with the satellite during a selected time slot, the one or more computing devices being configured to:

model parameters of the request using a capability model; and compare the modeled parameters of the request with capabilities of the antennas to determine a targeted time slot for an antenna that is compatible with the request.

17. The satellite service of claim 16, wherein the satellite ground station is included in a provider network for cloud-computing services, and wherein the satellite ground station is communicatively coupled to the antennas via one or more additional networks outside of the provider network.

18. The satellite service of claim 16, wherein the request is from an owner or operator of the satellite, and wherein the selected antenna has a different owner or operator.

19. The satellite service of claim 16, wherein the one or more computing devices are further configured to send a reservation request to the selected antenna responsive to determining the next-available time slot, the reservation request requesting the selected antenna to relinquish control from an owner or operator of the selected antenna to the satellite ground station during the next-available time slot.

20. The satellite service of claim 16, wherein the one or more computing devices are further configured to determine the capabilities of the antennas by modelling registration information for the antennas using an additional capability model.

* * * * *